United States Patent [19]

Buonavita

[11] 4,024,450
[45] May 17, 1977

[54] POWER TRANSISTOR SWITCHING CIRCUIT

[75] Inventor: Carlos Ernesto Buonavita, South Pasadena, Calif.

[73] Assignee: Burroughs Corporation, Detroit, Mich.

[22] Filed: Aug. 18, 1975

[21] Appl. No.: 605,434

[52] U.S. Cl. .................................... 321/2; 321/18
[51] Int. Cl.² ........................................ H02P 13/18
[58] Field of Search ............... 321/2, 16, 18, 45 R

[56] References Cited

UNITED STATES PATENTS

| | | | |
|---|---|---|---|
| 3,660,750 | 5/1972 | Bullinga | 321/16 |
| 3,670,234 | 6/1972 | Joyce | 321/18 |
| 3,863,131 | 1/1975 | Muir | 321/2 |
| 3,909,695 | 9/1975 | Peck | 321/2 |
| 3,916,282 | 10/1975 | Rothermal | 321/2 |

FOREIGN PATENTS OR APPLICATIONS 1,206,212  9/1970  United Kingdom ............... 321/2

Primary Examiner—William H. Beha, Jr.
Attorney, Agent, or Firm—Alfred W. Kozak; Nathan Cass; Kevin R. Peterson

[57] ABSTRACT

A circuit employing a transformer secondary winding having a fraction of its turns tapped across the base-emitter junction of a power transistor. A silicon controlled rectifier is connected from the transistor base across the entire secondary winding providing control of the power transistor conduction and reverse base drive upon power transistor turn-off. Synchronous control signals for the controlled rectifier may be developed by an additional secondary winding wrapped on the same core as the secondary winding driving the power transistor.

2 Claims, 12 Drawing Figures

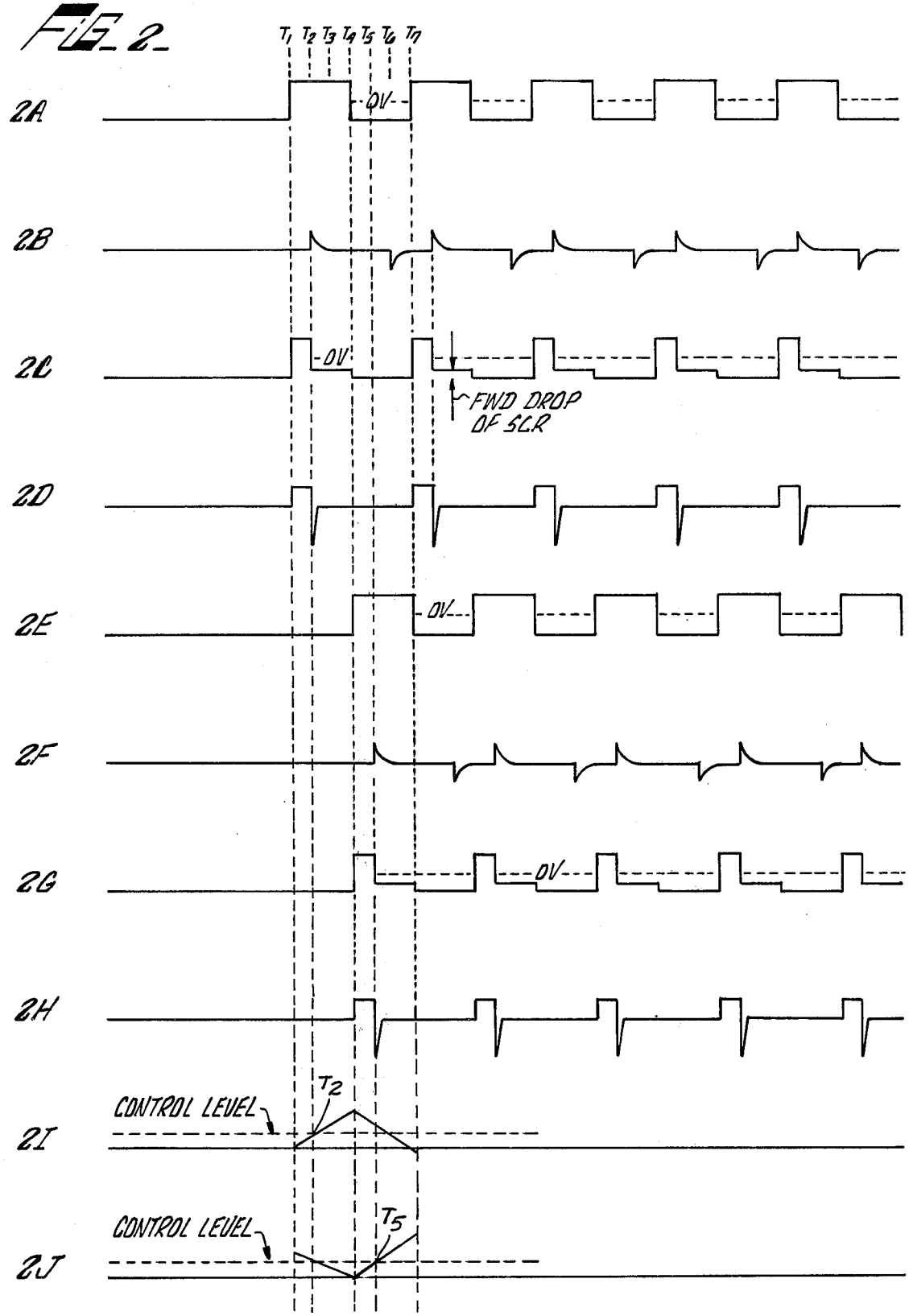

4,024,450

POWER TRANSISTOR SWITCHING CIRCUIT

BACKGROUND OF THE INVENTION

This invention relates broadly to high frequency switching circuits and more particularly to drive circuitry for achieving switching of power transistors.

High frequency switching regulators are being increasingly used as a result of their high efficiency, reduced physical size and weight and low audible noise levels. To achieve the high frequency operation, fast transistors with fast rise and fall times are required together with proper drive circuitry. Industry is now providing new, improved switching transistors and Schottky diodes to enable high frequency operation.

The next step is to provide driving circuitry which can take advantage of the high frequency capabilities of these improved switching transistors. Such a circuit must first provide fast turn-on and turn-off of the power transistors. The speed of turn-on and turn-off is directly related to the efficiency of the circuit since power is dissipated during switching times. The shorter the switching time, the less power is wasted. Furthermore, it is desirable to avoid configurations which require heat sinks and to minimize components.

SUMMARY OF THE INVENTION

It is therefore an object of the invention to provide improved circuitry for high frequency transistor switching.

It is another object of the invention to reduce power requirements, heat dissipation and the number of components in driving circuitry for high frequency power switching transistors, thus enabling embodiment of such a circuit in a self-contained control card.

These and other objects and advantages of the invention are achieved by using a switching device such as a silicon controlled rectifier (SCR) and a split coil configuration to control the base signal supplied to a power switching transistor. At one time only the center tap portion of the split winding is employed in the base drive circuit. At a later time, controlled by voltage regulating circuitry, the SCR is turned on and the entire winding is employed in the base drive circuit to provide reverse bias for decreasing the turn-off time of the associated power transistor.

BRIEF DESCRIPTION OF THE DRAWINGS

The preferred embodiment for implementing the invention will now be described with reference to the drawings of which:

FIG. 2 is a timing diagram illustrating wave shapes at various points in the power transistor drive circuitry of the preferred embodiment of the invention.

DETAILED DESCRIPTION OF THE PREFERRED EMBODIMENT

Figure 1:
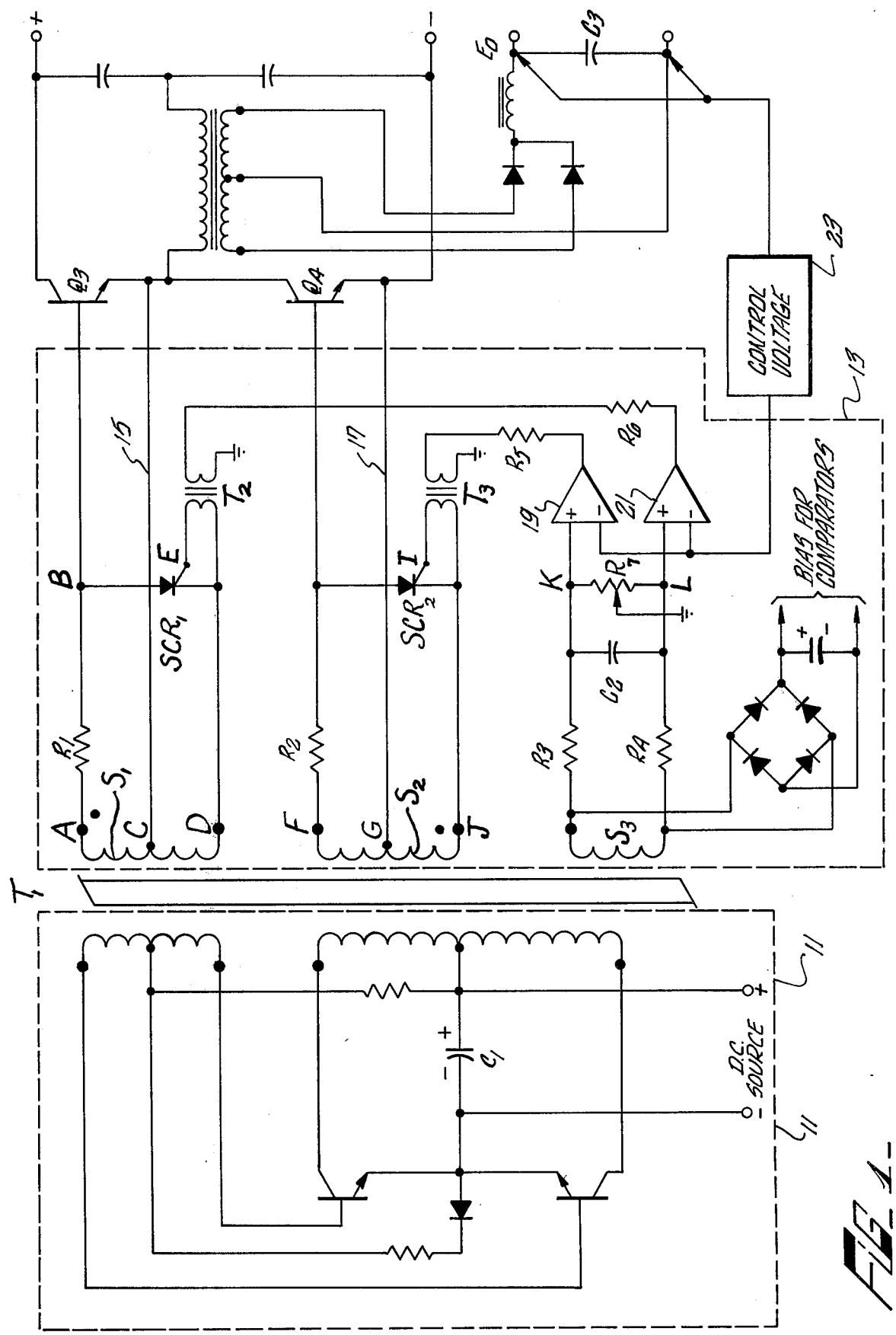
FIG. 1 is a schematic circuit diagram of the power transistor control circuitry of the preferred embodiment of the invention.

According to FIG. 1, a converter circuit 11 modulates a DC source voltage supplied across the terminals of the capacitor $C_1$ and supplies a square wave signal to a transformer $T_1$. This signal is utilized by the transistor driver circuitry 13 to control two power switching transistors $Q_3$, $Q_4$.

The converter circuit 11 may be of a well-known type used to modulate a DC source voltage. For example, such an oscillator may be of the self-oscillating variety as shown, or of the driven oscillator type. Such an oscillator normally supplies a square wave signal such as illustrated in FIG. 2A.

Associated with the core of the power transformer $T_1$ are three secondary windings $S_1$, $S_2$, $S_3$ of the power transistor driver circuitry 13. The two driving secondary windings $S_1$, $S_2$ are wound such that the voltage wave shapes at point "A" and "F" (FIGS. 2A and 2E respectively) are 180° out of phase with respect to each other. These wave shapes are tapped to provide activating drive to the power transistors $Q_3$, $Q_4$. The control secondary winding $S_3$ is employed to develop trigger pulses that are in synchronization with the wave shapes at points "A" and "F" to two silicon controlled rectifiers $SCR_1$, $SCR_2$.

The two controlled rectifiers, $SCR_1$, $SCR_2$ are connected to control the pulse width of the base drive supplied to the power transistors $Q_3$, $Q_4$ at points "B" and "H" (FIGS. 2C and 2G, respectively). As shown in FIG. 1, the first controlled rectifier $SCR_1$ has its anode connected through a resistor $R_1$ to a first terminal of the first secondary coil $S_1$ and its cathode connected to the second terminal of the first secondary coil $S_1$. The gate of the first controlled rectifier $SCR_1$ is connected to the first terminal of one winding of a gate trigger transformer $T_2$. The second controlled rectifier $SCR_2$ is similarly connected to the secondary winding $S_2$ and a second gate trigger transformer $T_3$. Each of the first and second driving secondary windings $S_1$, $S_2$ is center tapped by a respective connecting line 15, 17 to the respective emitters of the power transistors $Q_3$, $Q_4$.

The supply of trigger pulses to the gates of the controlled rectifiers $SCR_1$, $SCR_2$ is controlled by a comparison of the wave shapes at points "K" and "L" to a control voltage inputted to two comparators 19, 21. As is well known in the art, the control voltage may be produced by a control voltage source 23 from the voltage $E_0$ across an output filter capacitor $C_3$. In conjunction with the preferred embodiment of the invention, the control source 23 provides a voltage level which varies inversely with a departure of the output voltage from a desired value.

In operation, the waveform across the control winding $S_3$ is tapped from a first terminal of that winding via a resistor $R_3$ and a variable resistor $R_7$ to one input of the comparator 19. A resistor $R_4$ provides a similar input to the second comparator 21 across the variable resistor $R_7$. Upon proper adjustment of the resistor $R_7$, signals of proper amplitude and phase are developed at the inputs K, L (FIGS. 2I, 2J) to the respective comparators 19, 21. Because of the integrating effect of a capacitor $C_2$, these signals are triangular in shape.

The overall operation of the driver circuitry 13 may be explained with reference to FIG. 2. Starting at time $t_1$ the wave shape from point B to C across the center tap portion of the winding $S_1$ (FIG. 2C) is applied to the base of the transistor $Q_3$. In synchronization with the beginning of the B to C pulse, a ramp signal (FIG. 2I) is applied to the positive input of the comparator 21. When this ramp rises to the control voltage level produced by the control source 23 at time $t_2$, the comparator 21 supplies a gate pulse (FIG. 2B) to the first controlled rectifier $SCR_1$. The first controlled rectifier $SCR_1$ is thereby turned on and the entire first driving secondary winding $S_1$ is employed in the base drive circuit of the power transistor $Q_3$, thus providing reverse drive to decrease the turn-off time of transistor $Q_3$. As shown in FIGS. 2C and 2D, turn-off of the first controlled rectifier $SCR_1$ drops the base to emitter voltage of the power transistor $Q_3$ and results in a negative base current, rapidly turning off that power transistor $Q_3$.

At time $t_4$, the first controlled rectifier $SCR_1$ is turned off by the reverse bias applied by the trailing edge of the square wave at point A (FIG. 2A). Simultaneously with this turn-off, the wave shape at point F of FIG. 1 (illustrated in FIG. 2E) occurs, supplying a base drive to the power transistor $Q_4$. The second driving secondary winding $S_2$ is now controlled by the second silicon controlled rectifier $SCR_2$ in the same manner as the first driving winding $S_1$ was controlled by the first silicon controlled rectifier $SCR_1$. At the end of actuation of the second controlled rectifier $SCR_2$ the first rectifier $SCR_1$ is again actuated, resulting in rapid alternate switching of the power transistors $Q_3$, $Q_4$.

OPERATION

The general operation of this preferred embodiment of the invention involves putting a forward or driving bias from the winding $S_1$ across the base-emitter of transistor $Q_3$. This is seen in FIG. 2A which shows the voltage at point A of FIG. 2.

Thus, transistor $Q_3$ will be in a conducting state from the time period $T_1$ onward.

While this is occurring, there are feedback sensing voltage means from the output $E_0$ which develop a control voltage at 23 to provide reference signals to comparators 19 and 21. Winding $S_3$ generates a triangular ramp signal (rising and falling) which is fed to the positive input terminals of each of the comparators 19 and 21.

When point L of FIG. 2 (seen as the ramp voltage of FIG. 2I) achieves an equality of voltage with the control voltage level from 23, then comparator 21 will provide a trigger pulse, shown in FIG. 2B at time $T_2$. This will operate through the gate trigger transformer $T_2$ to turn on SCR-1 in essence making a short circuit across points B and D, thus removing the forward bias drive voltage across points A and C and connecting a negative (reverse) bias from point D to point B of greater voltage than was the forward bias. At this time, $T_2$, the base to emitter voltage of transistor $Q_3$, as seen at FIG. 2C (the voltage between point B referred to point C in FIG. 1), will drop below the zero voltage level and will cause the transistor $Q_3$ base current to momentarily form a reverse current as shown at FIG. 2D. This, of course, will insure an exceedingly rapid turnoff of switching transistor $Q_3$, such that no time is wasted nor power is wasted trying to switch off this transistor. It is a positive action.

Likewise, FIGS. 2E, 2F, 2G and 2H illustrate the same sequence of events, except 180° later, for the switching transistor $Q_4$. In this case the FIG. 2E shows the foward base drive to $Q_4$, showing the voltage at point F referred to point G.

FIG. 2F shows the gating pulse from comparator 19 when SCR-2 is turned on, by trigger transformer $T_3$, at point I of FIG. 1, thus, to cause SCR-2 to short points F and J of FIG. 1.

FIG. 2G shows the base-emitter voltage of switching transistor $Q_4$ and shows the voltage from point H to point G of FIG. 1. FIG. 2H shows the transistor $Q_4$ base current which is reversed at time $T_5$, in an analogous fashion to the shut-off of transistor $Q_3$ at the time $T_2$.

FIG. 2J shows the ramp voltage (rising and falling) at point K of FIG. 1 and the voltage equality point at time $T_5$.

Several advantages arising from the invention should be noted. The circuit provides fast switching of power transistors and pulse width modulation output voltage regulation, while employing only one source of DC power, which is completely isolated from the output power. Furthermore, the minimal number of circuit components used generate very little heat and thus eliminate the need for heat sinking. The drive circuit meets the requirements for proper operation of many types of high frequency inverter configurations and other control requirements such as electric motor speed control. It is therefore to be understood that within the scope of the appended claims, the invention may be practiced other than as specifically described.

What is claimed is:

1. A regulated voltage power supply having transistor switching circuitry which develops a regulated D.C. output voltage from the switching and rectification of an unregulated D.C. voltage, said switching circuitry comprising:
    a. a first and second power switching transistor, each having a base, emitter and collector electrodes;
       a1. a square wave generator which is energized by said unregulated D.C. voltage source;
       a2. transformer means having a primary winding energized by the output of said square wave generator, and having a first, second, and third secondary winding, said first and second secondary winding so arranged as to have a portion thereof connected across the base and emitter of said first and second switching transistors, thus to form a first and second floating circuit which is isolated D.C.-wise from other circuits of the regulated power supply;
    b. first and second SCR switching means, connected across said first and second secondary windings of said transformer means, said first and second SCR switching means so connected as to provide, when triggered, a negative cut-off bias across each of the base-emitter junctions of each of the said power switching transistors;
       b1. a triangular ramp voltage generating circuit energized by said third secondary winding and functioning to form a first and second train of triangular sawtooth pulses which are 180° out of phase;
       b2. a control voltage source to provide a voltage level representative of the amount of departure of the regulated D.C. output voltage from its desired value;
       b3. first and second comparator means for comparing the value of the output of said control voltage source with the voltage of said first and second train of triangular sawtooth voltages;
       b4. means to provide a first and second trigger pulse when the output voltage of said control source exceeds the instantaneous value of the voltage on said first and second pulse trains of said triangular sawtooth voltage;
       b5. first and second pulse trigger transformers connected from said first and second comparator means to said first and second switching means in said first and second floating circuits.

2. A regulated voltage power supply having switching circuitry which develops a regulated D.C. output voltage from the switching and rectification of an unregulated D.C. voltage, said switching circuitry comprising:
   a. a first and second power switching transistor, each having base, emitter, and collector electrodes;
   b. a first and a second floating circuit, each said circuit connected to the base and emitter of each of said switching transistors, said floating circuit being used to carry the current through said base-emitter when said transistor is in a conducting state, and further said floating circuit being isolated D.C.-wise from other circuits of the regulated power supply;
   c. transformer means for applying forward driving pulses via said first and second floating circuit across the base-emitter junctions of each of said first and second switching transistors, said driving pulses being derived from first and second secondary windings of said transformer means, said transformer means also providing a third secondary winding for driving a triangular ramp voltage generating means;
     c1. square wave generating means for energizing the primary winding of said transformer means;
     c2. triangular ramp voltage generating means for generating a first and a second triangular ramp voltage signal which is representative of the voltage level and phase of the square wave generated by said square wave generating means, said first and said second triangular ramp signals being 180° out of phase;
     c3. a control-voltage producing means representative of the amount of deviation of the D.C. output voltage from a desired value;
   d. first and second comparator means for comparing the control voltage from said control voltage producing means with the said first and second triangular ramp signals;
     d1. first and second pulse transformers respectively connecting said first and second comparator means with said first and second floating circuits;
     d2. first and second SCR switching means, connected across said first and said second secondary windings of said transformer means, said first and second switching means connected so as to connect when triggered, a negative cut-off bias across each of said base-emitter junctions of each of said switching transistors;
     d3. means connecting said first and said second pulse transformers respectively to said first and second SCR switching means;
   e. means for generating a trigger pulse at the moment of equality of voltage between said control voltage and said triangular ramp signal, said trigger pulse being generated from each of said first and second comparator means to alternately pulse said first and second pulse transformers thus to alternately switch the SCR switching means to cause rapid turn-off alternately of each of said switching transistors;
   f. an output transformer and rectifier connected to said first and second switching transistors to provide regulated voltage D.C. output of said power supply.

* * * * *